UNITED STATES PATENT OFFICE.

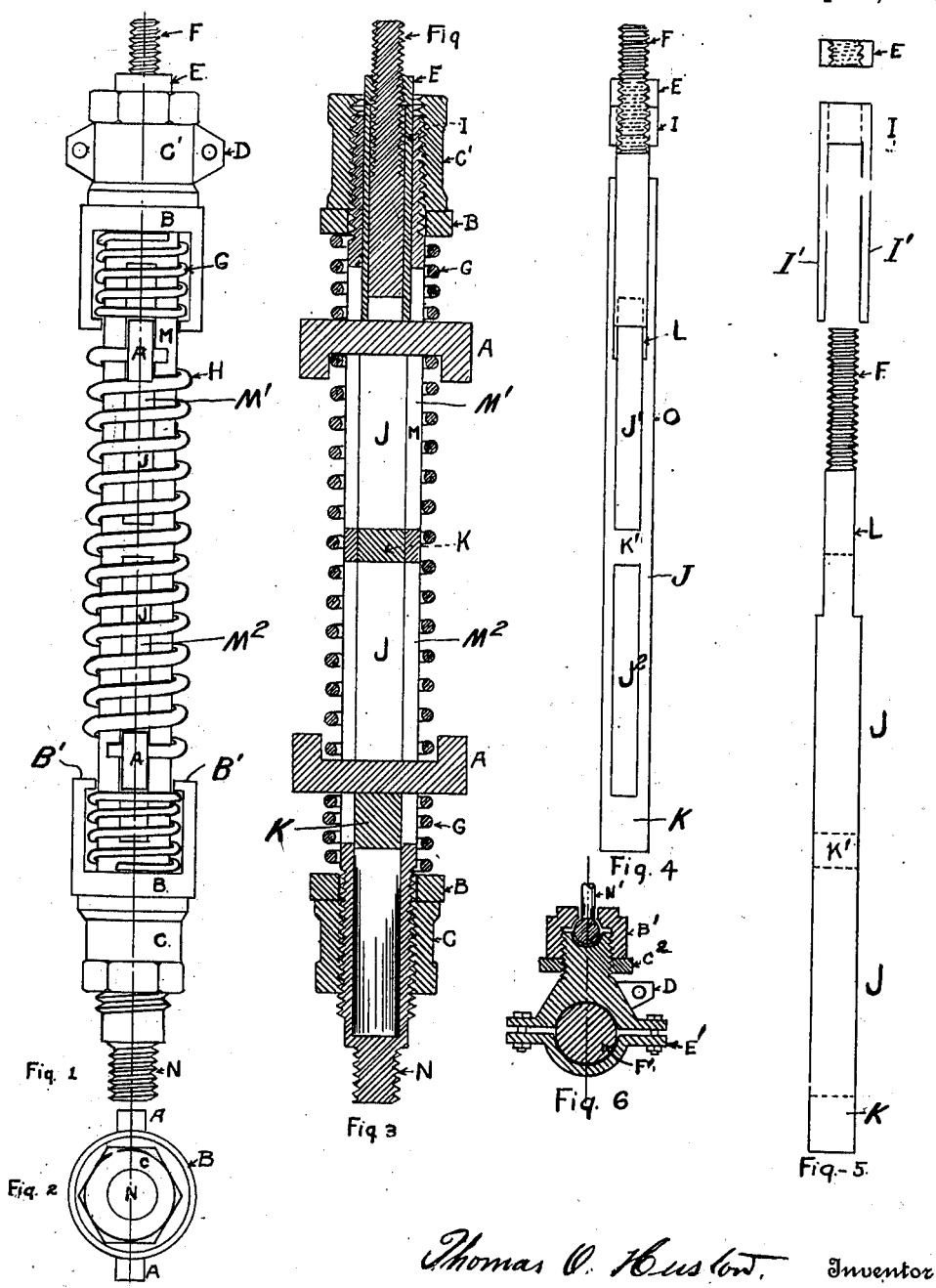

THOMAS O. HUSTON, OF GENEVA, NEBRASKA.

SHOCK-ABSORBER.

988,782.   Specification of Letters Patent.   Patented Apr. 4, 1911.

Application filed December 19, 1910. Serial No. 598,075.

*To all whom it may concern:*

Be it known that I, THOMAS O. HUSTON, a citizen of the United States, residing at Geneva, in the county of Fillmore, State of Nebraska, have invented certain new and useful Improvements in Shock-Absorbers, of which the following is a description, reference being had to the accompanying drawing and to the letters and figures of reference marked thereon.

The invention relates to new and useful improvements in shock absorbers, and more especially to devices of this character which are adapted to be used in connection with motor vehicles or other heavy vehicles.

An object of the invention is to provide a shock absorber which shall be simple in construction and durable and efficient in action, and wherein the yielding effect of the absorber is brought into use, regardless of the direction of longitudinal strain on said absorber.

In the drawings which show by way of illustration one embodiment of the invention; Figure 1 is a side elevation of a shock absorber having my improvements embodied therein; Fig. 2 is an end view thereof; Fig. 3 is a longitudinal sectional view through the same; Fig. 4 is a side elevation of the central stem; Fig. 5 is a view similar to Fig. 4, showing the parts of the stem separated; Fig. 6 is a sectional detail view showing one manner of attaching my absorber to the axle of a motor vehicle.

My improved shock absorber consists generally of an outer sleeve and an inner stem which slides freely in the outer sleeve, cross heads which have a sliding movement relative to the sleeves and the stem, and a main spring which encircles the sleeve and engages at its opposite ends, said cross heads. I may also use auxiliary springs which serve as cushions for the cross heads.

In the drawings, the outer sleeve M is threaded at each end, and at one end said sleeve is closed and carries a projecting stud N, which may be threaded as shown in Figs. 1 and 3, or which may be smooth and provided with a ball on the end thereof as shown at N', Fig. 6. On one end of said sleeve is a threaded nut C against which rests a cap or washer B. Said cap or washer B carries arms which extend longitudinally of the sleeve M, and are bent inwardly so as to house and limit the movement of the auxiliary cushioning spring G. On the other end of the sleeve M is a threaded nut C' and a similar washer or cap B rests against said nut C', and forms a housing for the auxiliary cushioning spring G at this end of the sleeve. The sleeve M is provided with two longitudinal slots M', M². Cross heads A extend through the slots M', M², respectively, and rest normally against the cushioning springs G. A main spring H encircles the sleeve M and at its opposite ends engages the cross heads A.

A central stem J is adapted to fit within the sleeve M, and said stem is provided with two longitudinal slots J', J², which also receive respectively the two cross heads A. The stem J has a solid portion K at one end, a central solid portion K', and a solid portion L at its other end, which is threaded as at F Fig. 5. A collar I is adapted to fit over the threaded portion F of the stem J, and said collar I has two extensions I', which engage cut-away portions on the sides of the stem J. The diameter of the collar I and the stem J are the same, so that these parts will freely slide in the outer stem M. The threaded nut E engages the threaded portion F of the stem J, and serves as an adjustable means for locating the collar I on said stem.

When the parts are in the position shown in Fig. 3, the main spring H will force the cross heads A, A, outwardly, so that said cross heads will rest against the solid portion K of the stem J at one end, and the extensions I' of the collar I at the other end.

In the use of my device, the stem F is secured to one of the parts, and the projecting stud N of the outer sleeve, is secured to the other part. Any suitable means may be provided for securing these portions of my shock absorber to the proper parts between which the yielding spring connection is desired.

In Fig. 6 I have shown the projecting stud N as smooth and carrying a ball on the end thereof, as shown at N'. The axle F' of the vehicle is clamped between the divided parts of the bracket E', and said ball is clamped in a socket formed in the bracket by the cap B', which screws against a limiting nut C². A similar bracket may be used at the other end of the shock absorbing device, for connecting the same to the body of the vehicle. I have shown the bracket as provided with ears D, and also the threaded nut on one end of the sleeve M as carrying similar ears D for the purpose of securing brace-rods to the spring device.

In the operation of my device, the parts are normally in the position shown in Fig. 3. If the strain on the shock absorber is an outward strain, then the stem J will slide out of the sleeve M. The solid portion K of the stem will engage the cross head A, and compress the spring H against the other cross head forcing the same against the cushioning spring G, and finally against the upper end of the slot M' in said sleeve. When the parts are released from this outward strain, they will at once return to their normal position, and the spring G at the lower end of the sleeve as viewed in Fig. 3 will receive and cushion the return movement of the parts. If the absorbing device is subjected to a compression strain, then the stem J will be forced into the sleeve, and the extensions I' engaging the cross head A at the upper end of the sleeve, will force the same downward compressing the spring H against the lower cross head, the movement of which compresses the spring G and finally said cross head engages the lower end of the slot $M^2$. When the parts are released they will return to their normal position, as above noted.

It is obvious that from certain aspects of the invention, the springs G may be omitted without in any way altering the mode of operation of my device. It is also obvious that minor changes in the details of construction may be made without departing from the spirit of my invention.

Having thus particularly described my invention, what I claim as new and desire to secure by Letters Patent, is:—

1. A shock absorber including in combination, an outer sleeve, having slots formed therein and threaded portions on its outer ends, collars secured to the outer ends of said sleeve, a stem sliding within said sleeve and having slots registering with the slots in said sleeve, cross heads extending through said slots, a spring surrounding said sleeve and located between said cross heads, and auxiliary springs located between said cross heads and said collars.

2. A shock absorber including in combination, an outer sleeve having a slot therein, and having threaded outer ends, nuts threaded on said ends, collars carried by said sleeve, and adapted to engage said nut respectively, springs surrounding said sleeve and located adjacent said collars, each of said collars having projecting arms with inwardly projecting parts for housing and limiting the movement of the spring adjacent the collar, a stem sliding within said sleeve, and having slots registering with the slots in said sleeve, cross heads extending through said slots, and a spring surrounding said sleeve and engaging said cross heads.

3. A shock absorber including in combination, an outer sleeve having a slot therein, a stem adapted to slide in said sleeve and having a slot registering with the slot in said sleeve, cross heads extending through said slots, said stems having a solid portion at one end adapted to engage one of said cross heads, and a collar adjustably secured to the other end, and having extensions adapted to engage the other cross head, and a spring surrounding said sleeve and engaging at its ends said cross heads.

In testimony whereof I affix my signature, in presence of two witnesses.

THOMAS O. HUSTON.

Witnesses:
JOHN K. WARING,
ARTHUR D. CURTISS.